United States Patent [19]

Goodell et al.

[11] Patent Number: 4,942,019

[45] Date of Patent: Jul. 17, 1990

[54] GAS PURIFIER

[75] Inventors: Paul D. Goodell, Ridgewood, N.J.; Lawrence C. Mitchell, Sr., Anaheim, Calif.

[73] Assignee: Ergenics, Inc., Ringwood, N.J.

[21] Appl. No.: 250,433

[22] Filed: Sep. 28, 1988

[51] Int. Cl.$^5$ .................. F01N 3/10; B01D 53/04
[52] U.S. Cl. ..................... 422/169; 422/171; 422/173; 422/177; 422/190; 55/269; 55/389
[58] Field of Search ............ 422/4, 122, 125, 169, 422/171, 173, 174, 177, 178, 191, 190; 55/208, 269, 38–39

[56] References Cited

U.S. PATENT DOCUMENTS

| | | | |
|---|---|---|---|
| 2,604,760 | 7/1952 | Southern | 55/208 |
| 2,898,202 | 8/1959 | Houdry et al. | 422/171 |
| 4,211,542 | 7/1980 | Kramer | 55/208 |
| 4,277,442 | 7/1981 | Hergart | 422/177 |
| 4,348,362 | 9/1982 | Foss | 422/178 |
| 4,425,143 | 1/1984 | Nishizawa et al. | 55/208 |
| 4,582,516 | 4/1986 | Kadi | 55/208 |
| 4,622,210 | 11/1986 | Hirschberg et al. | 422/178 |
| 4,859,427 | 8/1989 | Konishi et al. | 55/208 |

*Primary Examiner*—Robert J. Warden
*Assistant Examiner*—D. John Griffith, Jr.
*Attorney, Agent, or Firm*—Charles E. Baxley

[57] ABSTRACT

A system for purifying a gas provided with an apparatus comprising a main container defining a substantially closed chamber, an intake fitting having an intake projecting from the chamber and having inside the chamber a filter element, an outlet fitting having an outlet projecting from the chamber offset from the intake and having inside the chamber a filter element offset from the filter element of the intake fitting, and means defining in the chamber an internally sealed well between the filters. A baffle is provided in the chamber between the filters so that gas passing between the filters is deflected by the baffle. A heater is provided in the well. An outer container surrounds the main container and defines a space therearound. This space is insulated, either by being filled with an insulating material or by being evacuated. An active material generally fills the chamber around the filters and well so that a gas passing through the chamber from the intake filter to the outlet filter contacts the active material. Optionally the device may also have partitions defining in the chamber a second internally sealed well or a thermocouple. This thermocouple permits one to monitor the temperature of the active material bed.

3 Claims, 4 Drawing Sheets

GAS PURIFIER

FIELD OF THE INVENTION

The present invention relates to a gas purifier. More particularly this invention concerns a device for removing low-level impurities present in a nonreactive carrier gas or hydrogen and thereby producing a high-purity process gas whose reactive impurities are reduced to the parts per billion (ppb) range.

BACKGROUND OF THE INVENTION

In some production systems, for instance the manufacture of very large scale integrated circuits (VLSIC's), it is standard to work in an atmosphere of inert gas. It is essential, due to the tiny size and potential corrodibility of the parts, that this process gas be extremely pure, in fact any impurities such as oxygen or volatile hydrocarbons must be reduced to the ppb range where they are in fact barely measurable. Many other processes demand that the gas being used—whether an inert gas such as argon or xenon or a reactive gas such as hydrogen—be extraordinarily pure.

A variety of purification systems are available commercially. In some, as for example those marketed by Labclear, Inc. and Semi-Gas Systems, Inc., in-line cartridges filled with molecular-sieve or polymeric-resin absorber material are connected in series in the gas feed lines. These systems have straight-through flow and are intended generally for ambient temperature operation. Such systems do not reduce nitrogen or hydrogen to ppb levels and require either large quantities of absorber material or exceedingly low flow rates to reduce $CO_2$, $CH_4$, and other hydrocarbons to the ppb level.

In comparable purification systems, process gas is passed over metallic getter materials. Cu—CuO is used as an oxygen purifier by Supelco, Ti sponge by R. D. Mathis, and a Zr—V—Fe alloy by SAES Getters S.p.A. When heated the latter two materials are effective getters for all reactive gas species, including $N_2$, $CO_2$, and $CH_4$. However, existing purifier systems have bulky heaters, flanges, or inefficient gas-solid contacting. The Ti systems also are disadvantaged by higher operating temperatures required for purification.

OBJECTS OF THE INVENTION

It is therefore an object of the present invention to provide an improved gas-purification apparatus.

Another object is the provision of such an apparatus which is substantially smaller, more easily maintained, and less expensive to manufacture than the prior-art systems.

SUMMARY OF THE INVENTION

These objects are attained according to the invention in a system for purifying a gas provided with an apparatus comprising a main container defining a substantially closed chamber, an intake fitting having an intake projecting from the chamber and having inside the chamber a filter element, an outlet fitting having an outlet projecting from the chamber offset from the intake and having inside the chamber a filter element offset from the filter element of the intake fitting, and means defining in the chamber an internally sealed well between the filters. A baffle is provided in the chamber between the filters so that gas passing between the filters is deflected by the baffle. A heater is provided in the well. An outer container surrounds the main container and defines a space therearound. This space is insulated, either by being filled with an insulating material, by being provided with heat shields, or by being evacuated. An active material generally fills the chamber around the filters and well so that a gas passing through the chamber from the intake filter to the outlet filter contacts the active material. Optionally the device may also have means defining in the chamber a second internally sealed well or a thermocouple. This thermocouple permits one to monitor the temperature of the active material bed.

Such an arrangement is extremely compact and can be counted on to remove minute quantities of impurities, even when only measurable in the lower ppb range. The device can be produced at low cost and is very easy to use and install.

According to a feature of this invention the containers are of stainless steel and are welded together. The active material is made of zirconium, titanium, calcium, yttrium, the lanthanide elements (nos. 67 through 71), or alloys with these elements as major constituents, or composites, mixtures, or hydrides thereof. The gas being purified can be an inert gas such as argon, helium, krypton, or xenon. By proper selection of the active material and operating temperature, the inventive device can also be used with air, nitrogen, or hydrogen.

It is also possible according to this invention for the active material to be regenerable and be a molecular sieve compound or a copper oxide. Furthermore this active material can be a catalyst.

DESCRIPTION OF THE DRAWING

The above and other objects, features, and advantages will become more readily apparent from the following, reference being made to the accompanying drawing, Table, and Examples in which.

SPECIFIC DESCRIPTION

Figure 3:
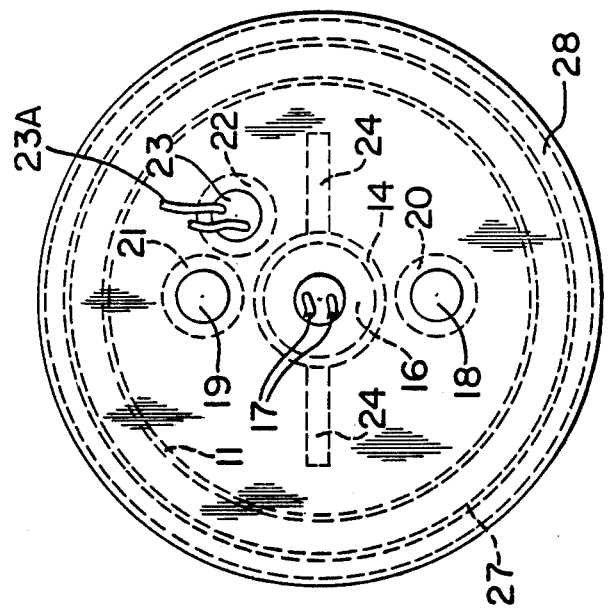
FIG. 3 is an end view taken from the right-hand side of FIG. 2.
Figure 2:
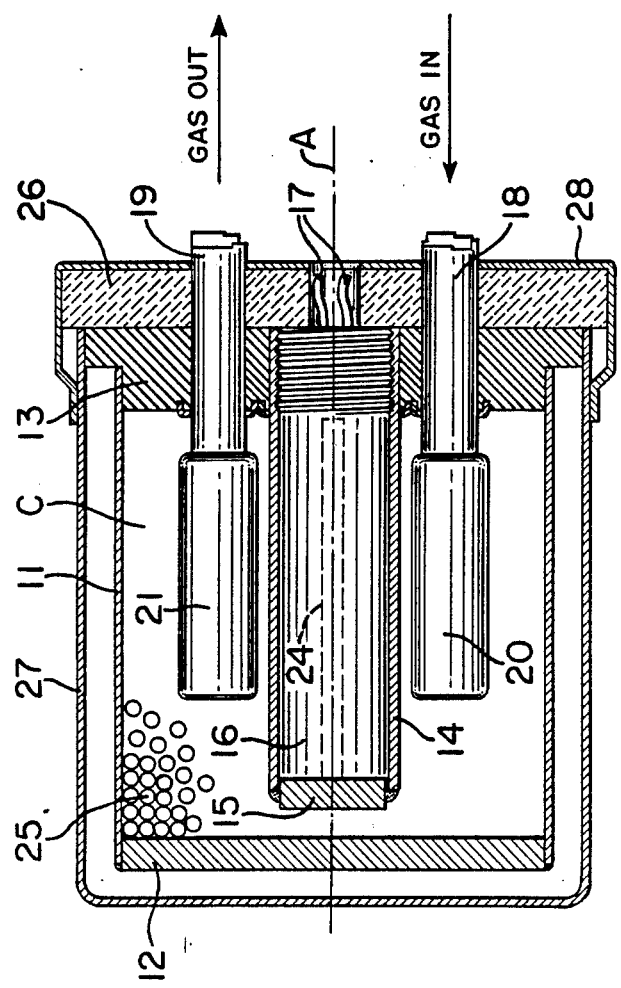
FIG. 2 is a longitudinal section through the gas-purification device according to this invention.

As seen in FIGS. 2 and 3 the system of this invention is basically axial-symmetrical to an axis A and comprises a main sleeve 11 defining with a top cap 12 and a base plate 13, all of stainless steel and welded together, enclosing a cylindrical chamber C. The base plate 13, which is fairly thick and serves for mounting purposes, has a central passage to which is fitted a sleeve 14 having an end at the plate 13 that is internally threaded and an opposite end blocked by a welded on stainless-steel plug 15. This sleeve 14 receives a heater 16 having leads 17.

In addition the base plate 13 is traversed to diametrically opposite sides of the heater sleeve 16 by input and output tubes 18 and 19 respectively fitted inside the chamber C with sintered filters 20 and 21. What is more, as seen in FIG. 3, only the plate accommodates another sleeve 22 accommodating a thermocouple 23 for monitoring temperature inside the unit and having leads 23A connected like the leads 17 to an unillustrated control unit.

Attached to and projecting diametrally oppositely from the sides of the heater well tube 14 in a plane perpendicular to the plane of the two filters 20 and 21 are baffle plates 24 whose outer edges are somewhat short of the inside surface of the sleeve 11 and which may extend all the way to the plate 12. The entire chamber C inside the sleeve 11 and around the sleeve 14 and filters 20 and 21 is filled with an alloy getter in the form of pellets 25 illustrated only in the upper left-hand corner of FIG. 2 for clarity of view.

The base plate 13 is fitted on its face away from the chamber C with a machined ceramic insulating plate 26. In addition a cup-shaped containment can 27 is fitted over the outer periphery of the plate 13 to define a space all around the chamber C. This space can be evacuated and optionally fitted with heat shields, in which case the stainless steel cup 27 and the plate 13 are welded together, or can be filled with insulation, for instance a ceramic. In addition a cover cap 28 is fitted over the plate 13 to protect it. If the space immediately inside the cup 27 is not to be evacuated, this cup 27 can be dispensed with and a larger-diameter such cup can be used to accommodate a thicker layer of insulation.

The reactor design disclosed above provides a number of advantages not heretofore available in gas purifiers intended for high-purity applications. The major components of the reactor are fitted to a single element, here the base plate 13, which facilitates component alignment as well as ease of assembly for overall reduced production costs. The active material can be loaded into the reactor via the large opening formed by the top cap 12. This assembly provides a wide range for the size of material that can be loaded, and facilitates internal cleaning and reloading of the device. The thick base plate 13, heavy-walled heater well 14, and outer shell 27 provide barriers to outward diffusion of species such as tritium.

In use the heater 16 is energized to heat the interior of the unit to about 450° C. and the gas to be purified is introduced, normally under positive pressure into the tube 18. The gas is coarsely filtered by the filter 20 and then passes angularly or circumferentially around the baffle plates 24 to the opposite filter 21 where it enters the tube 19 and passes to the process equipment in question. While traversing the chamber C in this manner it is intimately contacted with the getter granules 25 and the above-mentioned impurities are stripped from it.

The system is now manufactured in three basic sizes having the following dimensions:

TABLE

| Dimension | Small | Medium | Large |
| --- | --- | --- | --- |
| Diameter (in) of 11 | 2.12 | 2.62 | 4.01 |
| Diameter (in) of 27 | 2.75 | 3.25 | 5.25 |
| Axial length (in) of C | 3.2 | 3.8 | 8.3 |
| Thickness (in) of 13 | 0.5 | 0.5 | 0.8 |
| Axial length (in) of 27 | 4.2 | 5.0 | 9.8 |
| Wall thickn's (in) of 11 | 0.065 | 0.625 | 0.12 |
| Inside diam. (in) of 14 | 0.375 | 0.375 | 0.68 |
| Diameter (in) of 20 & 21 | 0.5 | 0.5 | 0.75 |
| Weight (g) of charge 25 | 300–500 | 700–1000 | 3000–5000 |

Larger or smaller systems can also be built successfully if the aspect ratio is maintained. As a rule the aspect ratio of internal length to diameter (C:A) should fall between 1.0 and 6.0, preferably around 1.5 as in the above-given examples. Such an aspect ratio minimizes difficulties with the selection of a cartridge heater 14 and also makes the system relatively simple to insulate by minimizing the surface/volume ratio. Aspect ratios greater than six have greater heat loss and require exceedingly long axial heaters and aspect ratios less than one also have greater heat losses and require multiple short heaters within the well. In addition the ratio of the diameter of the container to the diameter of the porous filter should fall between 2 and 8. Such a ratio allows the filters 20 and 21 to have a relatively great surface area relative to the volume of the contained alloy granules and thereby reduces the gas-pressure drop across the purifier.

In a variant of the system the baffle plates 24 extend all the way to the inside surface of the sleeve 11, but these plates are substantially shorter than the sleeve 11 and the filters 20 and 21 are also substantially shorter so that flow is axial and over the baffles 24 rather than angular and around them.

EXAMPLE I

A reactor/cannister of the small size described above in the table is filled with 300 g of pellets made from a Zr—V base alloy powder of the type sold under the tradename HY-STOR 402. The baffles and filters are arranged to provide for radial flow of process gas through the pellet bed. The unit is welded shut and a vacuum is applied simultaneously to both tubes 18 and 19 while the heater 16 is energized to heat the active material to 600° C. for activation. The assembly is then allowed to cool to ambient temperature and is backfilled with argon to preserve the activated condition.

Figure 1:
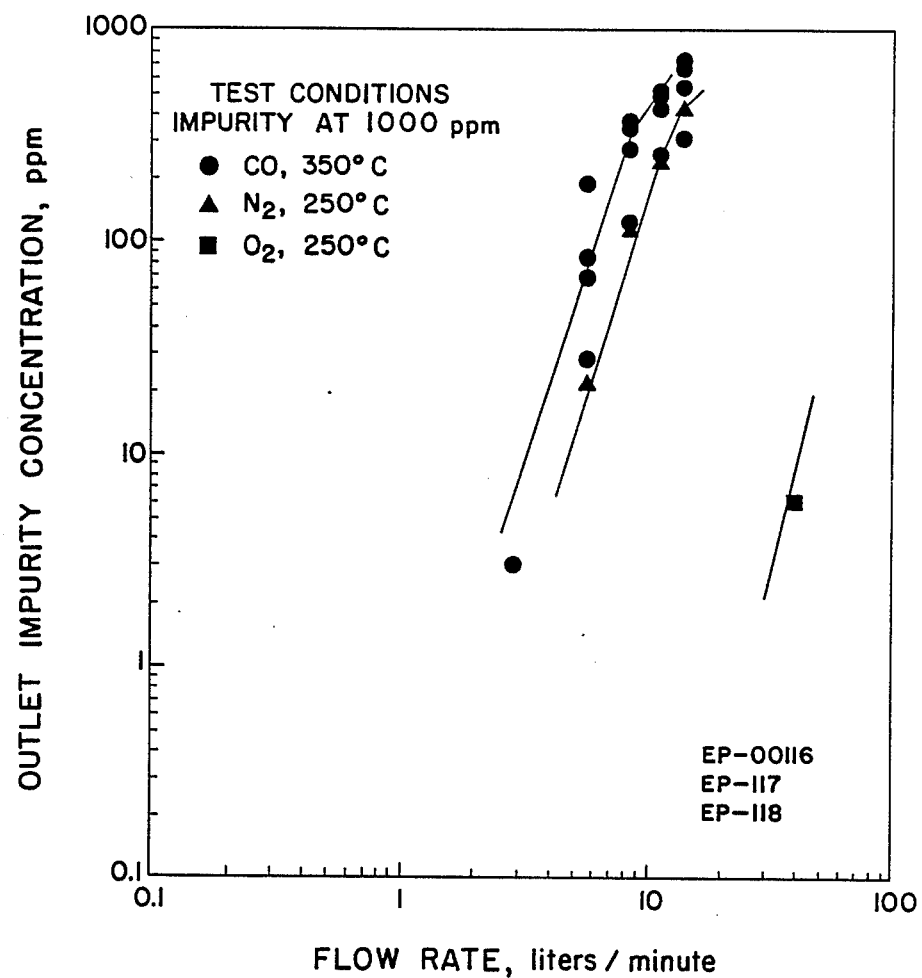
FIG. 1 is a graph illustrating impurity concentrations at various flow rates for an inert gas purifier according to this invention.

In order to demonstrate gas purification, the device is attached to a source of argon gas premixed with impurities at a known level. The purifier is equilibrated at a selected bed temperature and gas is passed through it at a controlled flow rate. The exiting gas is sampled with a residual gas analyzer to measure the impurity concentrations. Experiments are continued with different flow rates and bed temperatures for the same process gas. Similar data are obtained for a variety of other impurities and the results shown in FIG. 1. The flow rates and impurity levels used are both substantially smaller than normally encountered. The small reactor is rated for use with flow rates less than 2 liters/min. This selection is intentional to demonstrate quantitatively the purification with conventional laboratory test equipment. At 250° C. the oxygen concentration is reduced by three orders of magnitude for flow rates exceeding 10 l/min.

EXAMPLE II

Figure 4:
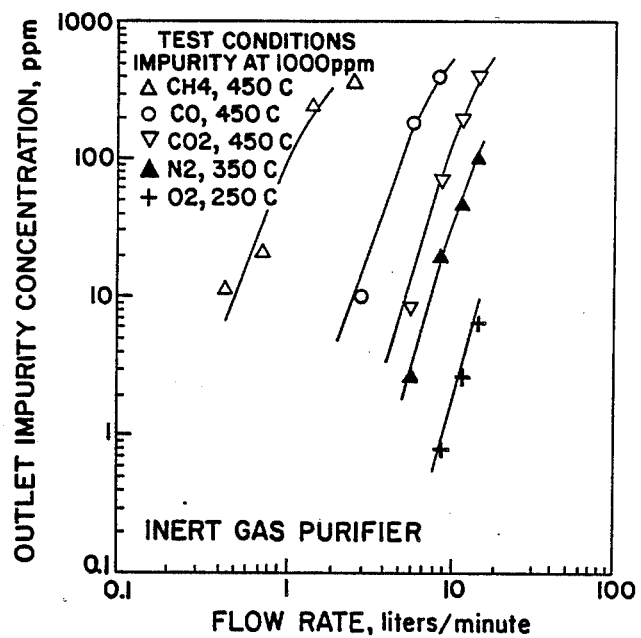
FIGS. 4, 5, and 6 are graphs illustrating the operation of the system of this invention.

Another reactor/cannister of the same small size as in Example I is filled with 200 g of HY-STOR 402 pellets and welded shut. Baffles and filters are arranged to provide for axial flow of gas through the bed. Activation and testing are carried out as in Example I. A broader range of impurity gases are examined and the results are shown in FIG. 4. The device of this invention therefore clearly is remarkably efficient, in particular for the more reactive oxygen and nitrogen species.

EXAMPLE III

A reactor/cannister of the same small size used in Examples I and II is filled with 200 g of pellets of purifying powder of the type sold under the tradename HY-STOR 402 and the unit is welded shut. The baffles and filters are arranged to provide for axial gas flow through the bed. The heater 16 is then energized to heat the charge to 600° C. while a vacuum is applied to both tubes 18 and 19 so as to activate the alloy, then the assembly is allowed to cool to ambient temperature and is backfilled with argon to preserve the activated condition.

Then as shown in FIG. 4 argon is flowed in a single pass through the device and various impurities—$CH_4$, $CO_X$, $N_2$, and $O_2$—are removed. The flow rates used and the impurity levels are both substantially higher than normally encountered to demonstrate quantitatively purification with conventional laboratory equipment (RGA). Clearly the device of this invention achieves remarkable efficiency, particular for the more reactive oxygen and nitrogen species.

EXAMPLE IV

Figure 5:
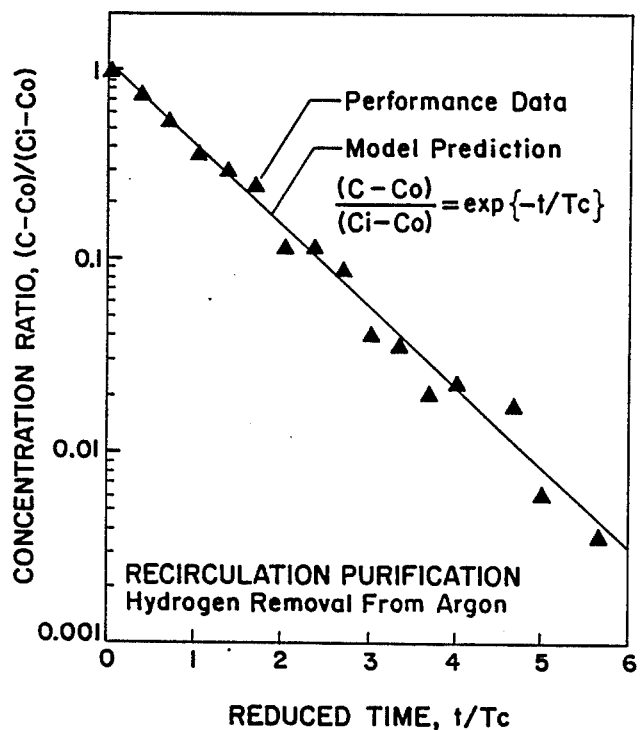
Figure 6:
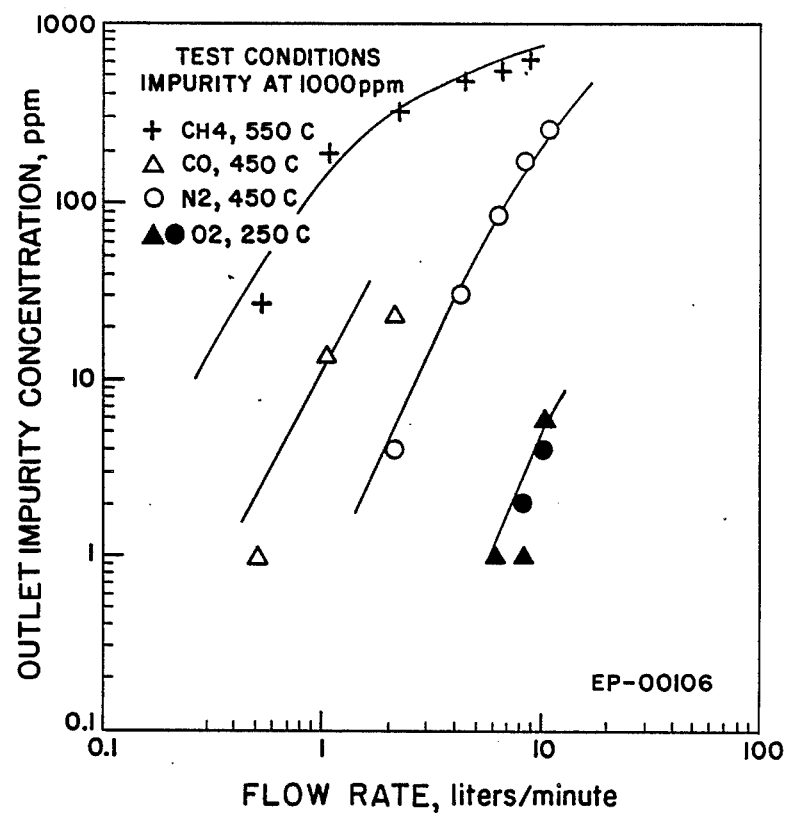

The same apparatus as in Example III is used as illustrated in FIG. 5 for the recirculation purification of argon, principally to remove hydrogen from it. Here the concentration of the closed space is compared with time. The volume in question is 3900 cc which is originally contaminated with 1000 parts per million (ppm) of hydrogen. The gas is circulated at 1000 cc/min and at 25° C. The theoretical purity obtainable is shown as a straight line and the drawing clearly illustrates how the actual performance closely corresponds to this theoretical performance.

EXAMPLE V

Another reactor of the same small size as in the preceding Examples is filled with 400 g of HY-STOR 402 granules. The baffles are arranged for axial gas flow through the bed. After the alloy is heated to activate it and then cooled it is hydrided by the introduction of hydrogen into the chamber at a slow rate to prevent overheating. Adequate void space is provided in the reactor to accommodate expansion of the granules on hydriding. Hydrogen gas is flowed through it in one pass. The results are similar to those of Example I indicating that the hydrided form of HY-STOR 402 is also an effective getter. For the same degree of purification, however, flow rates must be reduced.

The Examples given above show the utility of the device for the purification of process gas in either a flow-through or recirculating system. In addition the device of this invention can also be used for the recovery of the isotopes of hydrogen (deuterium and/or tritium) from inert gas streams. The hydrogen isotopes are absorbed by the active material during operation and are subsequently recovered by heating and/or evacuating the active material.

We claim:

1. In a system for processing a gas, an apparatus comprising:
   a main container having an end wall, a rear wall, and an annular side wall defining a substantially closed chamber;
   an intake fitting penetrating through the end wall and having an intake projecting from the chamber and having inside the chamber a filter element;
   an outlet fitting penetrating through the end wall and having an outlet projecting from the chamber offset from the intake and having inside the chamber a filter element offset from the filter element of the intake fitting;
   means defining in the chamber an internally sealed well between the filters; a baffle in the chamber between the filters and extending toward the annular side wall, whereby gas passing between the filters is diverted from the intake around the baffle to the outlet;
   a heater in the well;
   an outer container surrounding the main container and defining a space thereabout;
   means in the space for insulating the main container from the outer container; and an active material generally filling the chamber around the filters and well.

2. The gas purification apparatus defined in claim 1 wherein the containers are of stainless steel and are welded together.

3. The gas purification apparatus defined in claim 2, further comprising
   means defining within the chamber a second internally sealed well; and
   a thermocouple in the well.

* * * * *